May 5, 1925.
T. L. VALERIUS
ICE CREAM FREEZER
Filed Nov. 9, 1921
1,536,247
2 Sheets-Sheet 2
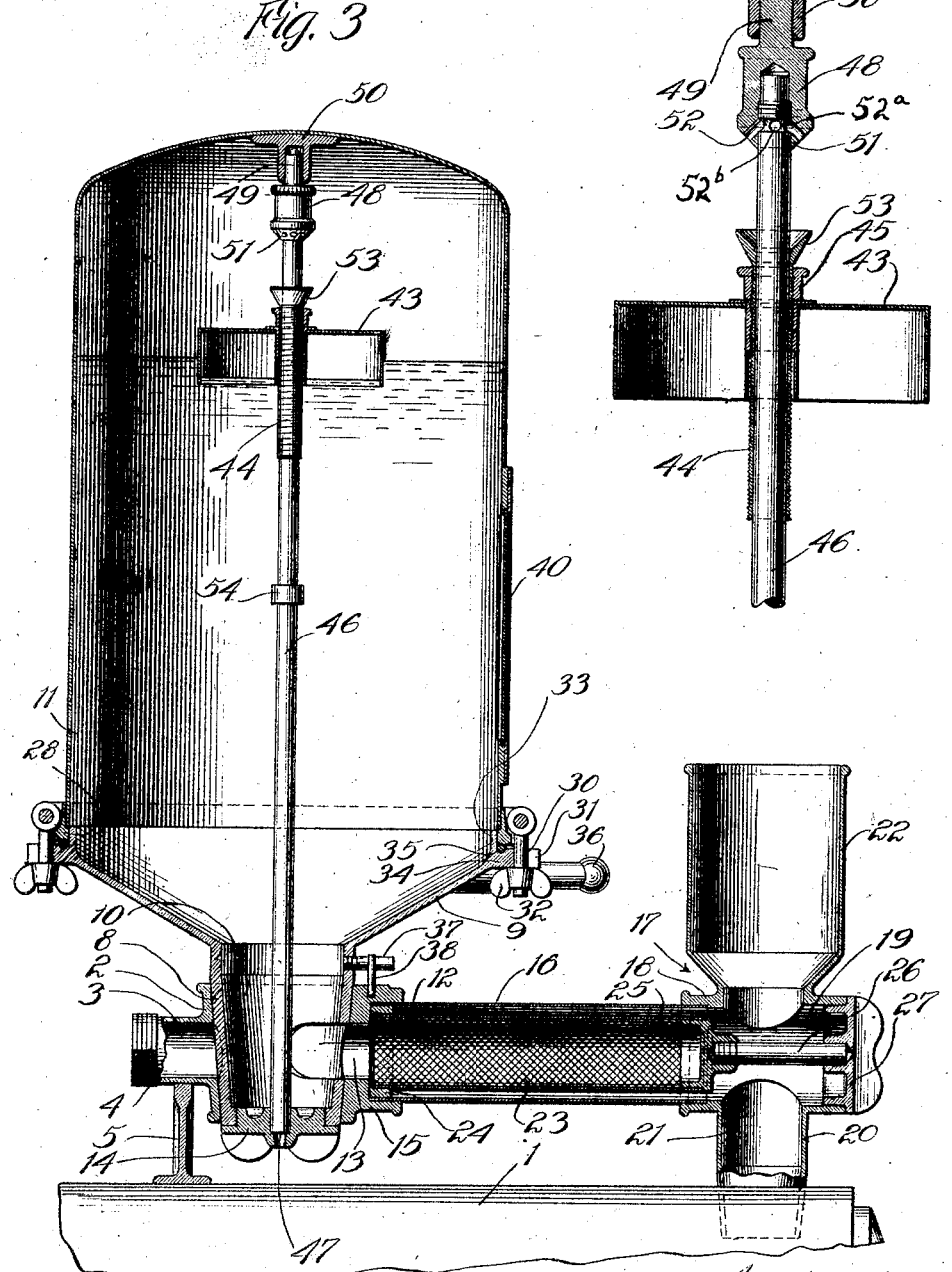
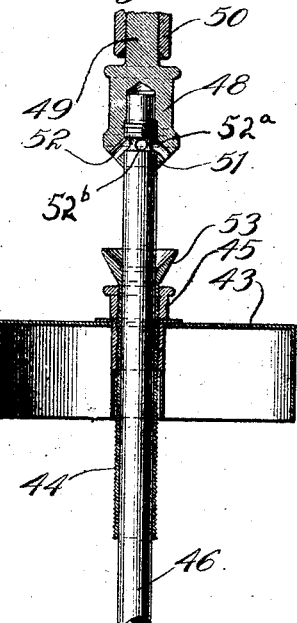
Inventor
Theodore L. Valerius
by Hewitt S. Dixon Atty Patented May 5, 1925.

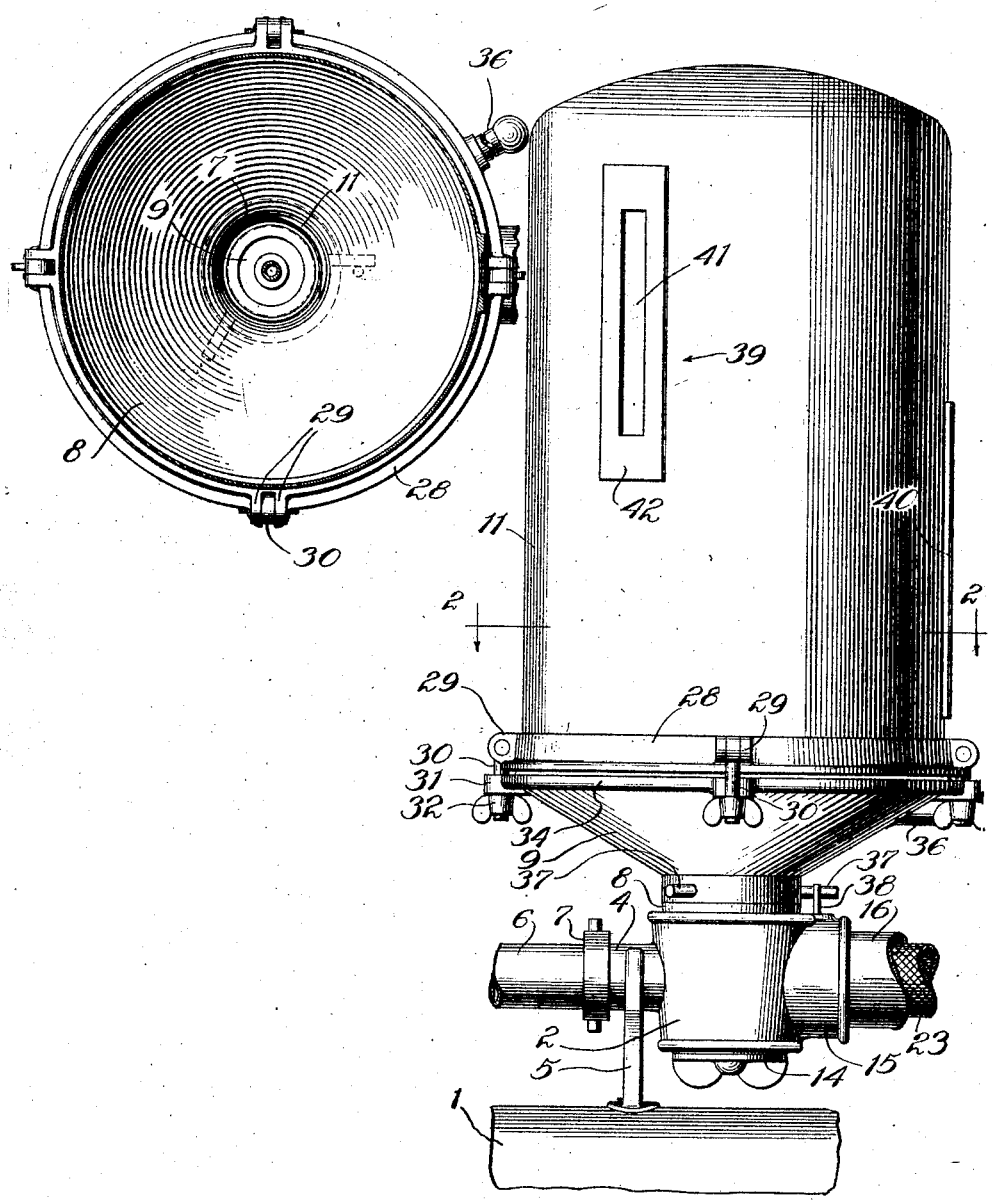

1,536,247

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

Application filed November 9, 1921. Serial No. 513,992.

*To all whom it may concern:*

Be it known that I, THEODORE L. VALERIUS, a citizen of the United States, residing at Fort Atkinson, Wisconsin, have invented certain new and useful Improvements in Ice-Cream Freezers, of which the following is a specification.

The invention relates to ice cream freezers of the type which is equipped with a receptacle for the measurement of a "batch" of liquid ingredients to be discharged into the freezer for the manufacture of the frozen product.

It is the usual practice in the commercial manufacture of ice cream to prepare in advance a large quantity of the desired ingredients, known as the "mix," which is stored in suitable vats. A supply pipe line running from the mix vats is usually provided and arranged to deliver therefrom successive "batches" of mix to a series of freezers wherein the ice cream is frozen. It has been customary to mount upon each freezer an open receptacle into which the mix is drawn to the required amount and thereafter drained into the freezer.

It is important in delivering the batches of mix to the freezers that the quantity be accurately measured so that a uniform quality, texture and density of the frozen product may be preserved in the successive batches from the several freezers. It is desirable also to handle the mix under the most sanitary conditions practicable, and by such means as will permit of the rapid efficient service of the freezers with a minimum of personal attendance by the operators.

One of the principal objects of this invention is to provide an improved device by which an exact quantity of mix may be automatically measured out from the supply line into an enclosed batch tank preliminary to charging the freezer therewith through an enclosed screened conduit.

Another object is to provide an improved device of the type described which requires attendance only to start the respective filling and emptying of the batch tank, the filling operation being automatically stopped by float controlled means within the tank when the desired amount has been received.

A further object is to provide such a device in which a minimum of simply constructed parts devoid of inaccessible recesses comprise the conducting elements for the mix, and which parts are capable of being readily disassembled for thorough cleansing.

Other objects and advantages will be apparent in the following description of a preferred embodiment of my invention, which I have illustrated in the accompanying drawings. It will be understood, however, that in the interpretation of the appended claims, they are not to be limited to the precise construction and arrangement set forth, except as may be necessitated by the state of the prior art.

In the accompanying drawings, Fig. 1 is a side elevation of the device, in which are shown fragmentary representations of one well known type of a freezer on which the device may be mounted, and of the parts forming the outlet conduit.

Fig. 2 is a horizontal section taken on the plane of the line 2—2 in Fig. 1.

Fig. 3 is a vertical section taken on the plane of the longitudinal axis of the device.

Fig. 4 is a detail view of the float control mechanism partially in section.

Referring to the drawings, the numeral 1 indicates a fragmentary upper portion of the cylinder of a freezer of the well known horizontal type. Positioned above the freezer cylinder 1 is a valve casing 2, having an inlet 3 through a lateral extension 4, the casing being partially supported by an upright leg 5 mounted on the freezer and forming a seat for the extension 4. The inlet extension is adapted to be connected, as by a pipe 6 and coupling 7, with the usual supply pipe line from the mix vat in which the ice cream ingredients are prepared.

A tubular valve 8 operable on a vertical axis and having a conical bearing periphery is seated in the casing 2. Mounted on the upper end of the tubular valve 8 and preferably integral therewith is a funnel shaped member 9, into which opens the interior chamber 10 of the valve. The member 9 carries an inverted receptacle or tank 11, mounted thereon as hereinafter described, adapted to receive the measured batch of mix. The valve 8 preferably is provided with a single lateral port 12, positioned to register, upon rotation of the valve in its seat, selectively with the inlet 3 and an outlet 13 opening through the casing wall into a conduit leading to the freezer cylinder.

The lower end of the tubular valve 8 is closed preferably by a winged cap 14 threaded within the valve and of an outer diameter not greater than the outer diameter of the adjacent portion of the valve.

This construction of the valve and its casing permits lifting the valve out of its seat in the casing without first removing any parts, an obvious advantage in facilitating the cleaning of the valve. Mounting the receptacle upon the conical valve assures the sealing against leakage between the valve and its seat, the supported weight accomplishing the grinding in of the bearing surfaces and the continuous taking up of wear.

The outlet 13 passes through a lateral extension 15 of the casing 2, in which is suitably sealed a tubular conduit 16 extending laterally and sealed at its other end in a fitting 17 mounted on the freezer and leading to its interior. The fitting 17 is preferably constructed with a horizontal portion 18, forming a chamber 19 in continuation of and of no less internal dimensions than the conduit 16, and having a vertical portion 20 forming an intersecting passage 21 communicating at its lower end with the interior of the freezer. As illustrated, the fitting 17 is also provided with a cup shaped upper portion 22 opening into the upper end of the passage 21 and forming an inlet for the introduction of flavoring material into the freezer through a single passage.

A tubular strainer 23, positioned within the conduit 16 is secured at one end in a collar 24 which abuts a shoulder formed in the portion 15 about the outlet passage 13. The collar 24 supports the strainer in spaced relation to the walls of the conduit with the outlet 13 opening into the interior of the strainer, and is slidable with the strainer outwardly through the conduit 16 and chamber 19. The opposite end of the tubular strainer 23 is closed by a supporting head 25 suitably secured therein, and having a longitudinally extending pin 26 mounted in its outer face. The outer end of the pin 26 is removably supported in a suitable socket formed on the inner side of a winged end cap 27, the latter being threaded into the fitting 17 at the outer end of the chamber 19 to effect a removable closure thereof.

This construction provides a large strainer surface with a minimum resistance to flow compactly enclosed within the conduit to the freezer. It possesses the important advantage of being completely removable for cleaning by simply removing the winged end cap 27 and withdrawing the strainer through the chamber 19.

The tank 11 is of sufficient capacity to hold the quantity of mix required for a batch of ice cream to be frozen, and preferably is constructed with its upper end permanently sealed. For securing and sealing the tank 11 to its supporting member 9, a ring 28 may be fixed upon the lower open end of the tank, provided at spaced intervals with pairs of ears 29 between which are pivoted eyebolts 30, the latter being adapted to swing between similar pairs of ears 31 provided on the member 9, and secured thereto by means of wing nuts 32.

The member 9 is herein constructed with a collar 33 extending within the tank ring 28 and guiding the latter to its seat upon a flange 34 formed at the base of the collar. Suitable packing 35 may be interposed between the ring 28 and flange 34.

The tank 11, base member 9 and valve 8 form, when assembled, a unitary structure which is turned as a whole in operating the valve 8. A handle 36 mounted in the member 9 serves to operate the valve 8, the arc of movement of the latter being limited to positions in which the ports register by means of a pair of spaced pins 37 laterally fixed in the upper portion of the valve and adapted to engage a stop pin 38 fixed in the valve casing 2.

For convenience in observing the contents of the tank from the front of the freezer, sight gauges may be mounted in the sides of the tank, one in the upper portion, as at 39, which is in front position when the tank and valve are swung into filling position, and one in the lower portion, as at 40, in front position when the tank is being emptied. The gauges illustrated comprise a glass plate 41, sealed over an aperture in the tank wall, and supported in position by a frame 42 suitably secured to the tank.

In the preferred embodiment of my invention, the quantity of mix received by the tank 11 when the valve 8 is positioned to admit flow from the inlet 3, is controlled by means of a float 43 preferably comprising a light weight downwardly opening metallic shell adapted to entrap air and be lifted by the rising liquid. The float may be adjustably mounted on a sleeve 44, as by screw threaded engagement therewith, its position at any point being secured by the locking collar 45.

The sleeve 44 carrying the float is longitudinally slidable on an upright tubular stem 46, which has its base secured in the valve cap 14. An opening 47 through the wall of the cap 14 establishes communication between the interior of the tubular stem and the atmosphere. The upper end of the stem terminates within a closed ferrule 48 sealed thereon and carrying a supporting pin 49 which removably extends into a socket member 50 mounted on the upper wall of the tank. The lower end of the ferrule is cone shaped to provide a valve seat 51 about the stem. Valve ports 52 pass radially inward from the conical seat and open into an annular channel 52$^a$ formed about the enclosed end of the stem and from which ports 52$^b$ open into the interior of the stem 46. The upper end of the sleeve 44 is outwardly flared to form a valve member 53 adapted to control the ports 52 by engagement with the valve seat upon the lifting of the float. The downward movement of the float and sleeve may be limited by a collar 54 mounted on the sleeve.

It will be obvious that with the valve 8 positioned with its port 12 in register with the inlet 3, the mix will flow upward through the valve chamber 10 into the tank 11. As the liquid rises in the tank the air trapped therein escapes through the air valve ports 52 and stem 46. When the liquid reaches the float and lifts the valve member 53 into engagement with the seat 51, the air ports are closed and the further escape of air is prevented. The air cushion thereby formed arrests the inflow of mix at any desired level determined by the adjustment of the position of the float on the sleeve 44. No attention is required during the filling operation, and an operator may swing the valve to fill the tank and leave it until he is ready to drain the batch into the freezer. The latter operation is accomplished by merely swinging the tank and valve into opposite position whereupon the batch is discharged through the port 13 into the strainer, and thence through the space between the strainer and the surrounding walls of the conduit 16, to the chamber 19, from where it flows into the freezer. As the liquid lowers in the tank the float falls and carries the valve member 53 away from the air ports 52, thereby admitting air through the stem 46 to the top of the tank and permitting the free discharge of the liquid therefrom.

Upon completing the freezing operations, the supply of mix may be cut off, and the device disassembled for cleaning. The latter is accomplished by simply lifting out the tank and valve structure and releasing the eyebolts 30 and cap 14 to separate those parts. Then by withdrawing the strainer, all of the parts are conveniently exposed for thorough sterilizing.

It will now be apparent that I have provided a simple, compact and efficient device for accurately and automatically measuring the liquid batches and delivering them to the freezer cylinder under improved sanitary conditions.

I claim as my invention:

1. In a device of the class described, the combination of a valve casing, a tubular valve removably mounted therein and extending through said casing, a receptacle attached to one end of said tubular valve, and a closure removably secured to the other end of said valve, said closure being adapted to pass through said casing with said valve in the removal of the latter.

2. In a device of the class described, a sealed tank, valve means for admitting and discharging liquid to and from said tank, a removable closure in the base portion thereof, an upwardly extending tube in said tank having one end outwardly sealed in said closure and inwardly communicating with the atmosphere therethrough, valve means for controlling communication between the upper interior of said tank and the interior of said tube, a float slidably supported on said tube, and means carried by said float adapted to close said valve when a predetermined amount of liquid has entered said tank.

3. In a device of the class described, a sealed tank, having an inlet in the lower portion thereof, and means for controlling the quantity of liquid flowing into said tank, comprising, an upright tube in the upper interior portion thereof, said tube having communication at one end outwardly of said tank, the other end of said tube being closed, an air port opening into said tube, a sleeve slidable on said tube and having a valve portion adapted to operatively cover and close said port, and a float mounted on said sleeve in adjustable relation to said valve portion, said float being adapted to rise with the inflowing liquid and by the closure of said port prevent the further escape of air from said tank.

4. In a device of the class described, a sealed tank, means for admitting and discharging liquid to and from said tank, an upright tube in said tank having communication outwardly of said tank, said tube having an opening communicating with the interior of said tank, a float slidably supported on said tube, and valve means carried by said float adapted to close said opening upon the entry into said tank of a predetermined amount of liquid.

In testimony whereof I have hereunto set my hand.

THEODORE L. VALERIUS.